US010310716B2

(12) United States Patent
Lee et al.

(10) Patent No.: US 10,310,716 B2
(45) Date of Patent: Jun. 4, 2019

(54) APPARATUS FOR SUPPORTING COOPERATION FOR JOINT EDITING OF ELECTRONIC DOCUMENT, AND METHOD OF OPERATING THE SAME

(71) Applicant: HANCOM INC., Seongnam-si, Gyeonggi-do (KR)

(72) Inventors: Taeju Lee, Yongin-si (KR); Yongkyung Oh, Yongin-si (KR); Kyury Kim, Seoul (KR)

(73) Assignee: HANCOM INC., Seongnam-si, Gyeonggi-do (KR)

( * ) Notice: Subject to any disclaimer, the term of this patent is extended or adjusted under 35 U.S.C. 154(b) by 102 days.

(21) Appl. No.: 15/516,676

(22) PCT Filed: Jun. 27, 2016

(86) PCT No.: PCT/KR2016/006871
§ 371 (c)(1),
(2) Date: Apr. 4, 2017

(87) PCT Pub. No.: WO2018/004021
PCT Pub. Date: Jan. 4, 2018

(65) Prior Publication Data
US 2018/0267679 A1    Sep. 20, 2018

(51) Int. Cl.
*G06F 17/24* (2006.01)
*G06F 3/0484* (2013.01)
(Continued)

(52) U.S. Cl.
CPC ............ *G06F 3/0484* (2013.01); *G06F 15/16* (2013.01); *G06F 15/76* (2013.01); *G06F 16/176* (2019.01);
(Continued)

(58) Field of Classification Search
CPC .... G06F 17/24; G06F 17/2247; G06F 17/227; G06F 17/2288; G06Q 10/101
See application file for complete search history.

(56) References Cited

U.S. PATENT DOCUMENTS 8,453,052 B1 *   5/2013   Newman ............. G06F 17/2211
                                                            715/255
9,292,482 B1 *   3/2016   Thiesen ................... G06F 16/93
(Continued)

FOREIGN PATENT DOCUMENTS

KR    10-2015-0091527 A    8/2005
KR       10-1159504 B1     6/2012
(Continued)

OTHER PUBLICATIONS

International Search Report in International Application No. PCT/KR2016/006871 dated Mar. 27, 2017 with English translation, 7pages.
(Continued)

*Primary Examiner* — Justin S Lee
(74) *Attorney, Agent, or Firm* — Park, Kim & Suh, LLC

(57) ABSTRACT

An apparatus and a method of supporting cooperation for joint editing of an electronic document according to an exemplary embodiment of the present invention transmit a markup language-based document, to which an editing contents generated up to present by a first user are reflected, to a client terminal of a second user when the second user participates in cooperation for an electronic document while the first user is editing the electronic document converted into the markup language-based document, thereby supporting the first user and the second user to simultaneously edit the same markup language-based document.

9 Claims, 3 Drawing Sheets

(51) Int. Cl.
*G06F 16/93* (2019.01)
*G06F 15/16* (2006.01)
*G06Q 10/10* (2012.01)
*G06F 15/76* (2006.01)
*G06F 16/176* (2019.01)
*G06F 17/22* (2006.01)
*H04L 29/06* (2006.01)
*H04L 29/08* (2006.01)

(52) U.S. Cl.
CPC ............ *G06F 16/93* (2019.01); *G06F 17/24* (2013.01); *G06Q 10/10* (2013.01); *G06F 17/22* (2013.01); *G06F 17/2247* (2013.01); *H04L 65/403* (2013.01); *H04L 67/02* (2013.01)

(56) References Cited

U.S. PATENT DOCUMENTS

| | | | | |
|---|---|---|---|---|
| 9,690,785 B1* | 6/2017 | Vagell | ............... | G06F 17/30011 |
| 2008/0134019 A1* | 6/2008 | Wake | ............... | G06F 17/2247 |
| | | | | 715/239 |
| 2009/0013262 A1* | 1/2009 | Hamaguchi | ............ | G06Q 10/10 |
| | | | | 715/751 |
| 2009/0327294 A1* | 12/2009 | Bailor | ............... | G06F 17/24 |
| 2010/0036860 A1* | 2/2010 | Hiura | ............... | G06F 17/2247 |
| | | | | 707/634 |
| 2010/0299591 A1* | 11/2010 | Suehiro | ............... | G06F 17/2247 |
| | | | | 715/239 |
| 2011/0138268 A1* | 6/2011 | Zhang | ............... | G06F 17/2211 |
| | | | | 715/239 |
| 2013/0283147 A1* | 10/2013 | Wong | ............... | G06F 17/21 |
| | | | | 715/234 |
| 2014/0215302 A1* | 7/2014 | Little | ............... | G06F 17/30893 |
| | | | | 715/229 |
| 2015/0193406 A1* | 7/2015 | Lemonik | ............... | G06F 17/24 |
| | | | | 715/256 |
| 2015/0341399 A1* | 11/2015 | Lee | ............... | H04L 65/403 |
| | | | | 715/255 |
| 2016/0139768 A1* | 5/2016 | Lemonik | ............... | G06F 17/2288 |
| | | | | 715/753 |
| 2016/0292289 A1* | 10/2016 | Milvaney | ............... | G06F 3/0484 |
| 2016/0328368 A1* | 11/2016 | Hyams | ............... | G06F 17/2211 |
| 2017/0185573 A1* | 6/2017 | Milvaney | ............... | G06F 17/2288 |

FOREIGN PATENT DOCUMENTS

| | | |
|---|---|---|
| KR | 10-2015-0115850 A | 10/2015 |
| KR | 10-2015-0135055 A | 12/2015 |
| WO | 2009/061638 A1 | 5/2009 |
| WO | 2009/079116 A2 | 6/2009 |
| WO | 2009/158108 A2 | 12/2009 |
| WO | 2013/109552 A1 | 7/2013 |
| WO | 2014/120624 A1 | 8/2014 |

OTHER PUBLICATIONS

Korean Office Action in Appln. No. 10-2017-7000808 dated Feb. 19, 2017 with English Translation.

* cited by examiner

APPARATUS FOR SUPPORTING COOPERATION FOR JOINT EDITING OF ELECTRONIC DOCUMENT, AND METHOD OF OPERATING THE SAME

CROSS-REFERENCE TO RELATED APPLICATIONS

This application is the National Stage filing under 35 U.S.C. 371 of International Application No. PCT/KR2016/006871, filed on Jun. 27, 2016, the contents of which are all hereby incorporated by reference herein in their entirety.

TECHNICAL FIELD

The present invention relates to technology for an apparatus and a method of supporting document cooperation, which support a plurality of users to simultaneously edit an electronic document.

BACKGROUND ART

Recently, according to the wide supply of electronic terminal devices, such as a computer, a smart phone, or a tablet PC, various kinds of electronic document-related programs, with which a user may read, write, and edit an electronic document by using the electronic terminal device, have been released.

The electronic document-related programs include a word processor supporting basic writing and editing of a document, a spread sheet assisting data input, calculation, and a data management, and presentation programs assisting a presentation of a speaker.

In the related art, in order for a user to read, write, and edit an electronic document by utilizing an electronic terminal device, the user needs to directly install the electronic document-related programs in the electronic terminal device, drive the electronic document-related programs, and read or write and edit the electronic document.

However, recently, a high speed Internet environment is established and a wireless Internet environment, in which a user is capable of accessing the Internet anytime and anywhere, is established, and an electronic document-related service is provided to an electronic terminal device that is a client terminal through a server in a remote place, so that a web-based electronic document service, which enables a user to read, write, and edit an electronic document anytime and anywhere even though the user does not install a predetermined electronic document-related program in an electronic terminal device, appears.

The web-based electronic document service supports various client terminals to access an electronic document service providing server, and then to read, write, and edit an electronic document through a browser installed in the client terminals, and supports various client terminals to act simultaneous cooperation in real time for the electronic document, so that the web-based electronic document service is mainly utilized in a company, a group, and the like.

The web-based electronic document service supports a user to read, write, and edit an electronic document through a browser installed in a client terminal if the client terminal can access the Internet, without a necessity for installing a predetermined electronic document writing program in the client terminal, so that it is possible to secure mobility of a user, thereby gradually increasing individual users.

Commonly, in order to support a client terminal connected through a network to perform editing of an electronic document through a browser, the web-based electronic document service is operated in a method, in which when an original electronic document is converted into a markup language-based document and the converted document is provided to the client terminal, the client terminal performs editing of the markup language-based document through the browser.

In relation to this, the web-based electronic document service requires a technology for supporting a plurality of users to simultaneously access one electronic document and simultaneously edit the electronic document, and particularly, research on a technology, in which in a situation where any one user is editing an electronic document, when another user participates in cooperation for simultaneously editing the corresponding electronic document, the documents of both users are synchronized, is required.

SUMMARY OF THE INVENTION

The present invention has been made in an effort to provide an apparatus and a method of supporting cooperation for joint editing of an electronic document, which, when a second user participates in cooperation for the electronic document while a first user is editing the electronic document converted into a markup language-based document, transmit a markup language-based document, to which editing contents generated up to the present by the first user are reflected, to a client terminal of the second user, and allocate a revision number based on an order of a generation of an editing command to each of editing commands generated by the first user, so that when the first user additionally edits the markup language-based document while the markup language-based document is transmitted to the client terminal of the second user, and the apparatus and the method transmit only an additionally generated editing command based on the revision number to the client terminal of the second user, thereby supporting the first user and the second user to simultaneously edit the same markup language-based document.

Technical Solution

An exemplary embodiment of the present invention provides an apparatus for supporting cooperation for joint editing of an electronic document, the apparatus including: a document providing unit, which converts an original electronic document into a markup language-based document and stores the markup language-based document in a memory, and transmits the markup language-based document to the client terminal of the first user when a request for an access to the original electronic document that is a cooperation target is received from a client terminal of a first user connected through a network; an editing command receiving unit, which receives one or more editing commands for the markup language-based document from the client terminal of the first user; a document editing performing unit, which reflects the one or more editing commands to the markup language-based document stored in the memory and performs editing; and a document sharing unit, which transmits the markup language-based document, which has been edited according to the one or more editing commands, to the client terminal of the second user in response to the request for the participation in the cooperation when a request for participation in cooperation for joint editing the electronic document is received from a client terminal of a second user connected through the network after the editing of the markup language-based document is performed.

Another exemplary embodiment of the present invention provides a method of operating an apparatus for supporting cooperation for joint editing of an electronic document, the method including: when a request for an access to an original electronic document that is a cooperation target is received from a client terminal of a first user connected through a network, converting the original electronic document into a markup language-based document and storing the markup language-based document in a memory, and transmitting the markup language-based document to the client terminal of the first user; receiving one or more editing commands for the markup language-based document from the client terminal of the first user; reflecting the one or more editing commands to the markup language-based document stored in the memory and performing editing; and when a request for participation in cooperation for joint editing the electronic document is received from a client terminal of a second user connected through the network after the editing of the markup language-based document is performed, transmitting the markup language-based document, which has been edited according to the one or more editing commands, to the client terminal of the second user in response to the request for the participation in the cooperation.

Advantageous Effects

According to the apparatus and the method of supporting cooperation for joint editing of an electronic document according to the exemplary embodiment of the present invention, when a second user participates in cooperation for the electronic document while a first user is editing the electronic document converted into a markup language-based document, a markup language-based document, to which an editing contents generated up to present by the first user are reflected, is transmitted to a client terminal of the second user, and a revision number based on an order of a generation of an editing command is allocated to each of editing commands generated by the first user, so that when the first user additionally edits the markup language-based document while the markup language-based document is transmitted to the client terminal of the second user, only an additionally generated editing command based on the revision number is transmitted to the client terminal of the second user, thereby supporting the first user and the second user to simultaneously edit the same markup language-based document.

DETAILED DESCRIPTION

Figure 1:
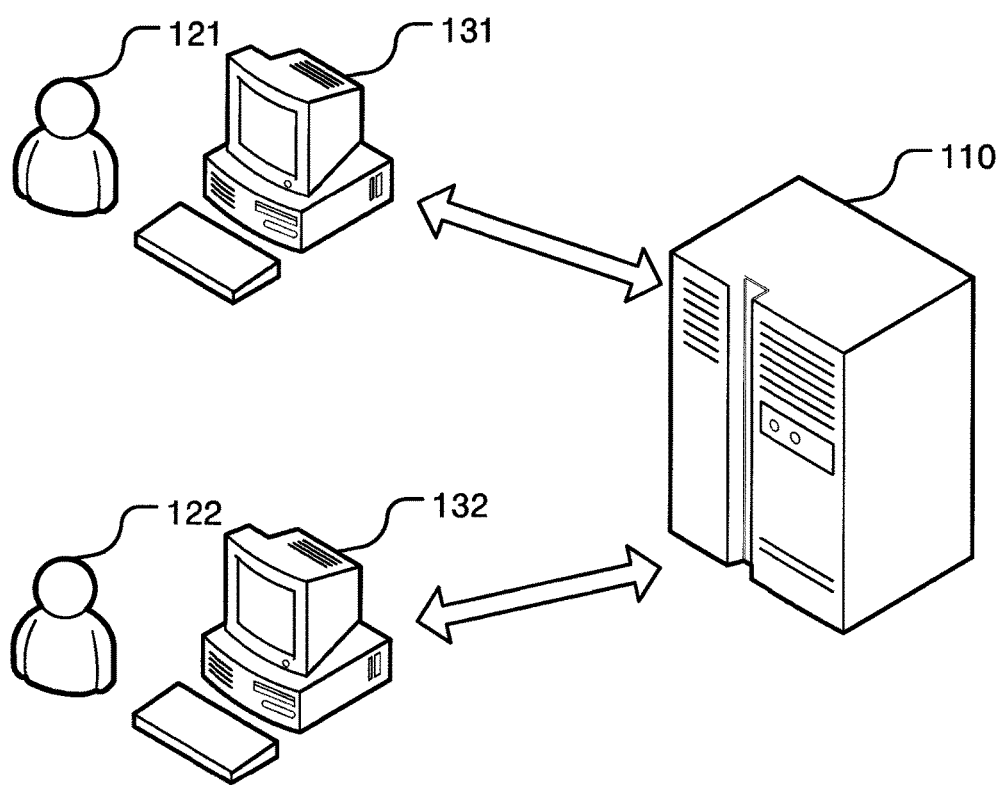
FIG. 1 is a conceptual diagram schematically illustrating an entire system for describing an apparatus for supporting cooperation for joint editing of an electronic document according to an exemplary embodiment of the present invention.

The present invention may be variously modified and have various exemplary embodiments, so that specific embodiments will be illustrated in the drawings and described in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

In the case where a component is referred to as being "connected" or "accessed" to other component, it should be understood that the component may not only be directly connected or accessed to the other component, but also there may exist another component between them. In contrast, when one constituent element is "directly coupled to" or "directly connected to" another constituent element, it should be understood that there are no intervening element present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other specific characteristics, numbers, steps, operations, constituent elements, and components, or a combination thereof in advance.

All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application.

Hereinafter, exemplary embodiments of the present invention will be described in detail with reference to the accompanying drawings.

FIG. 1 is a conceptual diagram schematically illustrating an entire system for describing an apparatus for supporting cooperation for joint editing of an electronic document according to an exemplary embodiment of the present invention.

FIG. 1 illustrates an apparatus 110 for supporting cooperation for joint editing of an electronic document according to the present invention, a client terminal 131 of a first user 121, and a client terminal 132 of a second user 122.

First, when a request for an access to an original electronic document that is a cooperation target stored in a predetermined document storage is received from the client terminal 131 of the first user 121 connected with the apparatus 110 for supporting cooperation for joint editing of the electronic document through a network is received, the apparatus 110 for supporting cooperation for joint editing of the electronic document may convert the original electronic document into a markup language-based document, store the markup language-based document in a memory, and transmit the markup language-based document to the client terminal 131 of the first user 121.

Here, the markup language-based document means a document formed of a markup language, such as a hypertext markup language (HTML) or an eXtensible markup language (XML), readable through a browser installed in a client terminal.

For example, when a request for an access to an original electronic document is received from the client terminal 131 of the first user 121 in the state where the original electronic document having an extension, such as "hwp" or "docx", is stored in a predetermined document storage, the apparatus 110 for supporting cooperation for joint editing of the electronic document may extract the original electronic document from the document storage, convert the original electronic document into a markup language-based document, such as an HTML, store the converted markup language-based document in a memory of the apparatus 110 for supporting cooperation for joint editing of the electronic document itself, and transmit the converted markup language-based document to the client terminal 131 of the first user 121.

In this case, according to the exemplary embodiment of the present invention, the document storage, in which the original electronic document is stored, may be embedded inside the apparatus 110 for supporting cooperation for joint editing of the electronic document, and may also be formed of a stand alone-based device separated from the apparatus 110 for supporting cooperation for joint editing of the electronic document.

In this case, when the client terminal 131 of the first user 121 receives the markup language-based document from the apparatus 110 for supporting cooperation for joint editing of the electronic document, the client terminal 131 of the first user 121 may render the markup language-based document through a first browser installed in the client terminal 131 of the first user 121 and display the markup language-based document on a screen.

When one or more editing commands for editing the markup language-based document are input from the first user 121, the first browser installed in the client terminal 131 of the first user 121 may edit the markup language-based document displayed on the screen based on the one or more editing commands, and transmit the one or more editing commands to the apparatus 110 for supporting cooperation for joint editing of the electronic document.

In this case, when the apparatus 110 for supporting cooperation for joint editing of the electronic document receives the one or more editing commands from the client terminal 131 of the first user 121, the apparatus 110 for supporting cooperation for joint editing of the electronic document edits the markup language-based document by reflecting the one or more editing commands to the markup language-based document, which has been stored in the memory of the apparatus 110 for supporting cooperation for joint editing of the electronic document, to maintain the same editing state as that of the markup language-based document stored in the client terminal 131 of the first user 121.

Simultaneously, the apparatus 110 for supporting cooperation for joint editing of the electronic document may allocate a revision number to each of the one or more editing commands received from the client terminal 131 of the first user 121 in an order of the generation of the one or more editing commands.

For example, when the one or more editing commands include "editing command 1", "editing command 2", and "editing command 3", and the editing commands are generated in an order of "editing command 1", "editing command 2", and "editing command 3" by the first user 121, the apparatus 110 for supporting cooperation for joint editing of the electronic document may allocate a revision number "revision 1" to "editing command 1", a revision number "revision 2" to "editing command 2", and a revision number "revision 3" to "editing command 3".

After the editing of the markup language-based document is performed as described above, when the apparatus 110 for supporting cooperation for joint editing of the electronic document receives a request for participation in cooperation for joint editing the electronic document from the client terminal 132 of the second user 122 through the network, the apparatus 110 for supporting cooperation for joint editing of the electronic document may transmit the markup language-based document, which has been edited according to the one or more editing commands, to the client terminal 132 of the second user 122 in response to the request for the participation in the cooperation.

Simultaneously, the apparatus 110 for supporting cooperation for joint editing of the electronic document may transmit a first revision number, which is last allocated to the one or more editing commands, to the client terminal 132 of the second user 122 in response to the request for the participation in the cooperation received from the client terminal 132 of the second user 122.

For example, when it is assumed that the one or more editing commands include "editing command 1", "editing command 2", and "editing command 3", and a revision number "revision 1" is allocated to "editing command 1", a revision number "revision 2" is allocated to "editing command 2", and a revision number "number 3" is allocated to "editing command 3", the apparatus 110 for supporting cooperation for joint editing of the electronic document may transmit the revision number "revision 3" that is the last revision number allocated to "editing command 3" to the client terminal 132 of the second user 122.

In this case, when the client terminal 132 of the second user 122 receives the markup language-based document, which is edited according to the one or more editing commands, from the apparatus 110 for supporting cooperation for joint editing of the electronic document, the client terminal 132 of the second user 122 may render the markup language-based document through a second browser installed in the client terminal 132 of the second user 122 and display the markup language-based document on a screen.

Accordingly, the second user 122 may view the markup language-based document having the same form as that of the markup language-based document displayed on the client terminal 131 of the first user 121 through the second browser installed in the client terminal 132 of the second user 122, so that the second user 122 is in the state of being capable of simultaneously editing the markup language-based document.

However, when an additional editing command for the markup language-based document is generated by the first user 121 while the apparatus 110 for supporting cooperation for joint editing of the electronic document transmits the markup language-based document, which has been edited according to the one or more editing commands, and the first revision number to the client terminal 132 of the second user 122, the markup language-based document displayed in the client terminal 132 of the second user 122 is different from the markup language-based document displayed in the client terminal 131 of the first user 121.

Accordingly, there is required a configuration for supporting the first user 121 and the second user 122 to maintain the markup language-based document displayed in the client terminal 132 of the second user 122 and the markup language-based document displayed in the client terminal 131 of the first user 121 to have the same state to simultaneously edit the markup language-based document even in this case.

To this end, when the apparatus 110 for supporting cooperation for joint editing of the electronic document receives one or more first additional editing commands for the markup language-based document from the client terminal 131 of the first user 121 while transmitting the markup language-based document, which has been edited according to the one or more editing commands and the first revision number to the client terminal 132 of the second user 122, the apparatus 110 for supporting cooperation for joint editing of the electronic document may additionally allocate a revision number to each of the one or more first additional editing commands with a start of a number corresponding to a number after the first revision number in an order of the generation of the one or more first additional editing commands after receiving the one or more first additional editing commands from the client terminal 131 of the first user 121.

For example, when "editing command 1", "editing command 2", and "editing command 3" are generated for the markup language-based document, and "editing command 4" and "editing command 5" are additionally and sequentially generated by the first user 121 after "revision 1", "revision 2", and "revision 3" are allocated to "editing command 1", "editing command 2", and "editing command 3", the apparatus 110 for supporting cooperation for joint editing of the electronic document may allocate "revision 4", which is a revision number starting with a number corresponding to a number after "revision 3", to "editing command 4", and allocate "revision 5" to "editing command 5".

In this case, when the client terminal 132 of the second user 122 receives the markup language-based document, which has been edited according to the one or more editing commands, and displays the markup language-based document on the screen through the second browser, the client terminal 132 of the second user 122 may transmit a request for transmission of the additional editing command, to which the revision number after the first revision number for the markup language-based document is allocated, to the apparatus 110 for supporting cooperation for joint editing of the electronic document.

In this case, when the apparatus 110 for supporting cooperation for joint editing of the electronic document receives the request for the transmission of the additional editing command, to which the revision number after the first revision number is allocated, from the client terminal 132 of the second user 122, the apparatus 110 for supporting cooperation for joint editing of the electronic document may determine whether there exists the additional editing command, to which the revision number after the first revision number is allocated, based on the additional editing command additionally received from the client terminal 131 of the first user 121.

In relation to this, in the case where the one or more first additional editing commands including "editing command 4" and "editing command 5" are received from the client terminal 131 of the first user 121 and "revision 4" is allocated to "editing command 4" and "revision 5" is allocated to "editing command 5" according to the aforementioned example, when the apparatus 110 for supporting cooperation for joint editing of the electronic document receives a request for transmission of an additional editing command, to which a revision number after "revision 3" is allocated, from the client terminal 132 of the second user 122, the apparatus 110 for supporting cooperation for joint editing of the electronic document may confirm that there exist the one or more first additional editing commands, that is, "editing command 4" and "editing command 5" to which "revision 4" and "revision 5" that are the revision numbers after "revision 3" are allocated as the additional editing commands additionally received from the client terminal 131 of the first user 121.

The apparatus 110 for supporting cooperation for joint editing of the electronic document may transmit the one or more first additional editing commands to the client terminal 132 of the second user 122.

In this case, when the client terminal 132 of the second user 122 receives the one or more first additional editing commands from the apparatus 110 for supporting cooperation for joint editing of the electronic document, the client terminal 132 of the second user 122 may reflect the one or more first additional editing commands to the markup language-based document, which is displayed through the second browser installed in the client terminal 132 of the second user 122, and make the markup language-based document displayed through the second browser have the same state as that of the markup language-based document displayed through the first browser installed in the client terminal 131 of the first user 121.

As a result, when the second user 122 participates in cooperation of an electronic document while the first user 121 edits the electronic document, which is converted into a markup language-based document, the apparatus 110 for supporting cooperation for joint editing of the electronic document according to the exemplary embodiment of the present invention may transmit the markup language-based document, to which editing contents generated up to present by the first user 121 are reflected, to the client terminal 132 of the second user 122, and allocates a revision number based on an order of the generation of editing commands for the editing commands generated by the first user 121, so that when the first user 121 additionally edits the markup language-based document while the markup language-based document is transmitted to the client terminal 132 of the second user 122, the apparatus 110 for supporting cooperation for joint editing of the electronic document may transmit only an additionally generated editing command based on the revision number to the client terminal 132 of the second user 122, thereby supporting the first user 121 and the second user 122 to simultaneously edit the same markup language-based document.

Figure 2:
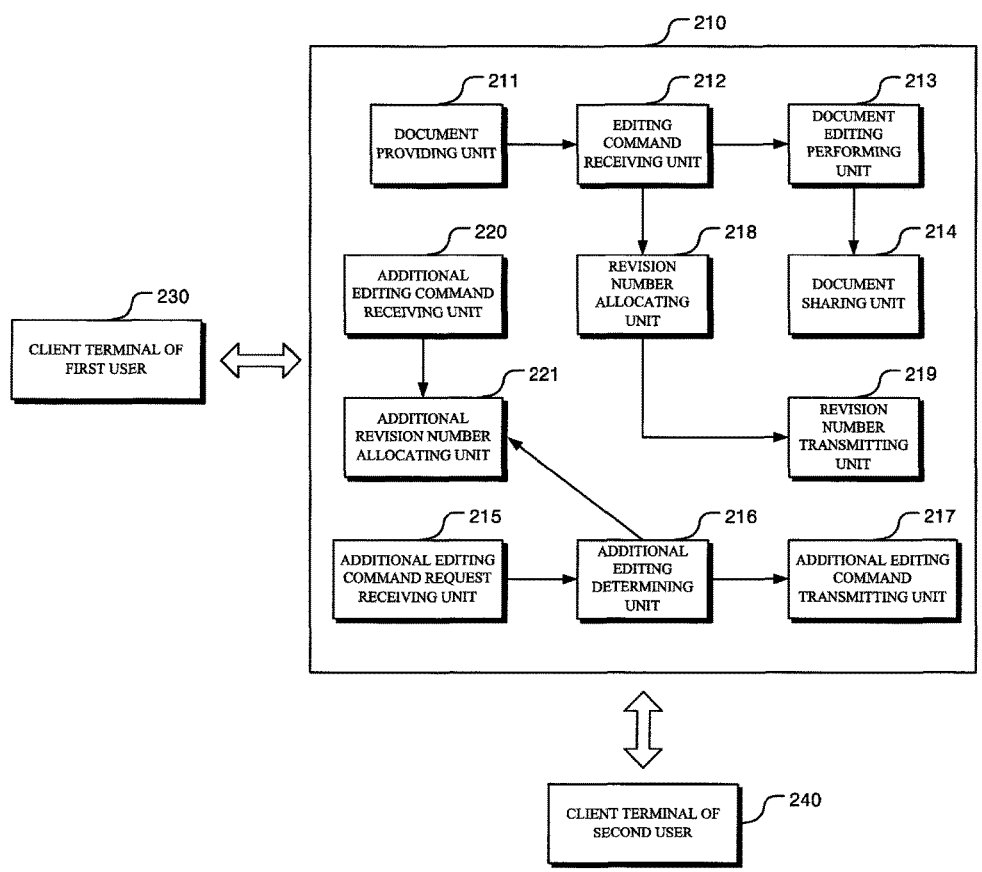
FIG. 2 is a diagram illustrating a structure of an apparatus for supporting cooperation for joint editing of the electronic document according to an exemplary embodiment of the present invention.

FIG. 2 is a diagram illustrating a structure of an apparatus for supporting cooperation for joint editing of the electronic document according to an exemplary embodiment of the present invention.

Referring to FIG. 2, an apparatus 210 for supporting cooperation for joint editing of the electronic document according to an exemplary embodiment of the present invention includes a document providing unit 211, an editing command receiving unit 212, a document editing performing unit 213, and a document sharing unit 214.

When the document providing unit 211 receives a request for an access to an original electronic document that is a cooperation target from a client terminal 230 of a first user connected through a network, the document providing unit 211 converts the original electronic document into a markup language-based document and stores the markup language-based document in a memory, and transmits the markup language-based document to the client terminal 230 of the first user.

The editing command receiving unit 212 receives one or more editing commands for the markup language-based document from the client terminal 230 of the first user.

The document editing performing unit 213 reflects the one or more editing commands to the markup language-based document stored in the memory and performs editing.

When the document sharing unit 214 receives a request for participation in cooperation for joint editing the electronic document from a client terminal 240 of a second user connected through the network after the editing of the markup language-based document is performed, the document sharing unit 214 transmits the markup language-based document, which has been edited according to the one or more editing commands, to the client terminal 240 of the second user in response to the request for the participation in the cooperation.

In this case, according to the exemplary embodiment of the present invention, when the client terminal 230 of the first user receives the markup language-based document, the client terminal 230 of the first user renders the markup language-based document through a first browser installed in the client terminal 230 of the first user and displays the markup language-based document on a screen, edits the markup language-based document, which is displayed on the screen, according to the one or more editing commands input from the first user, and transmits the one or more editing commands to the apparatus 210 for supporting cooperation for joint editing of the electronic document.

According to the exemplary embodiment of the present invention, the apparatus 210 for supporting cooperation for joint editing of the electronic document may further include an additional editing command request receiving unit 215, an additional editing determining unit 216, and an additional editing command transmitting unit 217.

The additional editing command request receiving unit 215 receives a request for transmission of an additional editing command for the markup language-based document from the client terminal 240 of the second user after the markup language-based document, which has been edited according to the one or more editing commands, is transmitted to the client terminal 240 of the second user.

The additional editing determining unit 216 determines whether there exists an additional editing command additionally received from the client terminal 230 of the first user, in addition to the one or more editing commands, in response to the request for the transmission of the additional editing command.

When it is determined that there exist one or more first additional editing commands as the additional editing command additionally received from the client terminal 230 of the first user, the additional editing command transmitting unit 217 transmits the one or more first additional editing commands to the client terminal 240 of the second user.

In this case, according to the exemplary embodiment of the present invention, the apparatus 210 for supporting cooperation for joint editing of the electronic document may further include a revision number allocating unit 218, a revision number transmitting unit 219, an additional editing command receiving unit 220, and an additional revision number allocating unit 221.

When the one or more editing commands are received from the client terminal 230 of the first user, the revision number allocating unit 218 allocates a revision number to each of the one or more editing commands in an order of the generation of the one or more editing commands.

The revision number transmitting unit 219 transmits a first revision number, which is last allocated to the one or more editing commands, to the client terminal 240 of the second user in response to the request for the participation in the cooperation received from the client terminal 240 of the second user.

When the one or more first additional editing commands for the markup language-based document are received from the client terminal 230 of the first user, the additional editing command receiving unit 220 receives the one or more first additional editing commands from the client terminal 230 of the first user.

The additional revision number allocating unit 221 additionally allocates a revision number, which starts with a number corresponding to a number after the first revision number, to each of the one or more first additional editing commands in an order of the generation of the one or more first additional editing commands.

In this case, the additional editing command request receiving unit 215 may receive a request for transmission of the additional editing command, to which the revision number after the first revision number is allocated, for the markup language-based document from the client terminal 240 of the second user after the markup language-based document, which has been edited according to the one or more editing commands, is transmitted to the client terminal 240 of the second user.

In this case, the additional editing determining unit 216 may determine whether there exists the additional editing command, to which the revision number after the first revision number is allocated, as an additional editing command additionally received from the client terminal 230 of the first user, in addition to the one or more editing commands, in response to the request for the transmission of the additional editing command.

In this case, when it is determined that there exist the one or more first additional editing commands, to which the revision number after the first revision number is allocated, as the additional editing command additionally received from the client terminal 230 of the first user, the additional editing command transmitting unit 217 may transmit the one or more first additional editing commands to the client terminal 240 of the second user.

In this case, according to the exemplary embodiment of the present invention, when the client terminal 240 of the second user receives the markup language-based document, which has been edited according to the one or more editing commands, the client terminal 240 of the second user may render the markup language-based document through a second browser installed in the client terminal 240 of the second user and display the markup language-based document on the screen, and transmit a request for the transmission of the additional editing command, to which the revision number after the first revision number is allocated, to the apparatus 210 for supporting cooperation for joint editing of the electronic document.

In the above, the apparatus 210 for supporting cooperation for joint editing of the electronic document according to the exemplary embodiment of the present invention has been described with reference to FIG. 2. Here, the configuration of the apparatus 210 for supporting cooperation for joint editing of the electronic document according to the exemplary embodiment of the present invention may correspond to the configuration of the apparatus 110 for supporting cooperation for joint editing of the electronic document described with reference to FIG. 1, so that a more detailed description thereof will be omitted.

Figure 3:
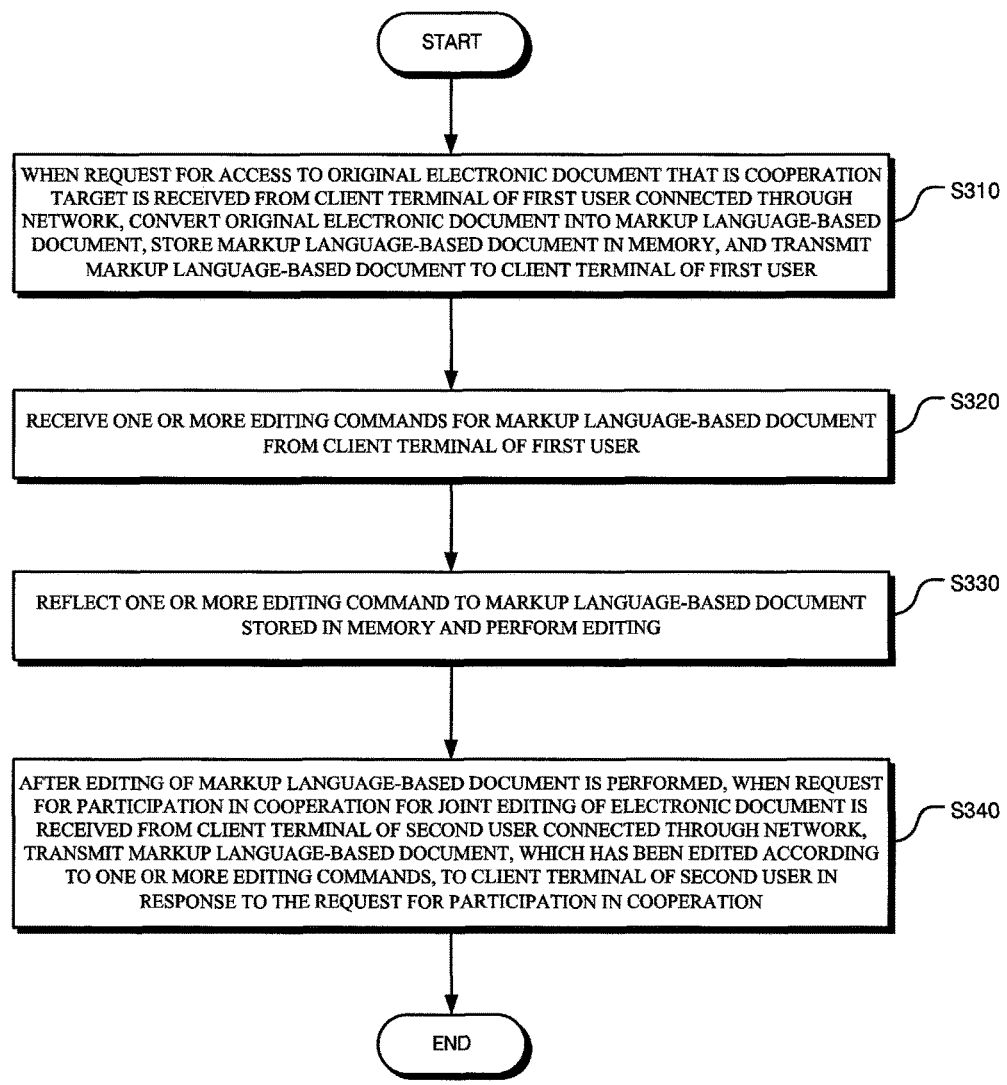
FIG. 3 is a flowchart illustrating a method of operating the apparatus for supporting cooperation for joint editing of the electronic document according to an exemplary embodiment of the present invention.

FIG. 3 is a flowchart illustrating a method of operating the apparatus for supporting cooperation for joint editing of the electronic document according to an exemplary embodiment of the present invention.

In operation S310, when a request for an access to an original electronic document that is a cooperation target is received from a client terminal of a first user connected through a network, the original electronic document is converted into a markup language-based document and the markup language-based document is stored in a memory, and the markup language-based document is transmitted to the client terminal of the first user.

In operation S320, one or more editing commands for the markup language-based document are received from the client terminal of the first user.

In operation S330, the one or more editing commands are reflected to the markup language-based document stored in the memory and editing is performed.

In operation S340, when a request for participation in cooperation for joint editing the electronic document is received from a client terminal of a second user connected through the network after the editing of the markup language-based document is performed, the markup language-based document, which has been edited according to the one or more editing commands, is transmitted to the client terminal of the second user in response to the request for the participation in the cooperation.

In this case, according to the exemplary embodiment of the present invention, when the client terminal of the first user receives the markup language-based document, the client terminal of the first user may render the markup language-based document through a first browser installed in the client terminal of the first user and display the markup language-based document on a screen, edit the markup language-based document, which is displayed on the screen, according to the one or more editing commands input from the first user, and transmit the one or more editing commands to the apparatus for supporting cooperation for joint editing of the electronic document.

According to the exemplary embodiment of the present invention, the method of operating the apparatus for supporting cooperation for joint editing of the electronic document may further include receiving a request for transmission of an additional editing command for the markup language-based document from the client terminal of the second user after the markup language-based document, which has been edited according to the one or more editing commands, is transmitted to the client terminal of the second user, determining whether there exists an additional editing command additionally received from the client terminal of the first user, in addition to the one or more editing commands, in response to the request for the transmission of the additional editing command, and when it is determined that there exist one or more first additional editing commands as the additional editing command additionally received from the client terminal of the first user, transmitting the one or more first additional editing commands to the client terminal of the second user.

In this case, according to the exemplary embodiment of the present invention, the method of operating the apparatus for supporting cooperation for joint editing of the electronic document may further include, when the one or more editing commands are received from the client terminal of the first user, allocating a revision number to each of the one or more editing commands in an order of the generation of the one or more editing commands, transmitting a first revision number, which is last allocated to the one or more editing commands, to the client terminal of the second user in response to the request for the participation in the cooperation received from the client terminal of the second user, when the one or more first additional editing commands for the markup language-based document are received from the client terminal of the first user, receiving the one or more first additional editing commands from the client terminal of the first user, and additionally allocating a revision number, which starts with a number corresponding to a number after the first revision number, to each of the one or more first additional editing commands in an order of the generation of the one or more first additional editing commands.

In this case, the receiving of the request for the transmission of the additional editing command may include receiving the request for the transmission of the additional editing command, to which the revision number after the first revision number is allocated, for the markup language-based document from the client terminal of the second user after the markup language-based document, which has been edited according to the one or more editing commands, is transmitted to the client terminal of the second user, the determining whether there exists the additional editing command may include determining whether there exists the additional editing command, to which the revision number after the first revision number is allocated, as an additional editing command additionally received from the client terminal of the first user, in addition to the one or more editing commands, in response to the request for the transmission of the additional editing command, and the transmitting of the one or more first additional editing commands to the client terminal of the second user may include, when it is determined that there exist the one or more first additional editing commands, to which the revision number after the first revision number is allocated, as the additional editing command additionally received from the client terminal of the first user, transmitting the one or more first additional editing commands to the client terminal of the second user.

In this case, according to the exemplary embodiment of the present invention, when the client terminal of the second user receives the markup language-based document, which has been edited according to the one or more editing commands, the client terminal of the second user may render the markup language-based document through a second browser installed in the client terminal of the second user and display the markup language-based document on the screen, and transmit a request for the transmission of the additional editing command, to which the revision number after the first revision number is allocated, to the apparatus for supporting cooperation for joint editing of the electronic document.

In the above, the method of operating the apparatus for supporting cooperation for joint editing of the electronic document according to the exemplary embodiment of the present invention has been described with reference to FIG. 3. Here, the method of operating the apparatus for supporting cooperation for joint editing of the electronic document according to the exemplary embodiment of the present invention may correspond to the configurations of the operations of the apparatuses 110 and 210 for supporting cooperation for joint editing of the electronic document described with reference to FIGS. 1 and 2, so that a more detailed description thereof will be omitted.

The method of operating the apparatus for supporting cooperation for joint editing of the electronic document according to the exemplary embodiment of the present invention may be implemented by a computer program stored in a storage medium for executing the method through a combination with a computer.

The method of operating the apparatus for supporting cooperation for joint editing of the electronic document according to the exemplary embodiment of the present invention may be implemented in a form of a program command executable through various computer means and may be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic medium, such as a hard disk, a floppy disk, or a magnetic tape, an optical medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, limited embodiments, and drawings, such as specific constituent element, but these are provided for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. An apparatus for supporting cooperation for joint editing of an electronic document, the apparatus comprising:
a processor configured to:
convert an original electronic document into a markup language-based document and store the markup language-based document in a memory, and transmit the markup language-based document to a client terminal of a first user when a request for an access to the original electronic document that is a cooperation target is received from the client terminal of the first user connected through a network;
receive one or more editing commands for the markup language-based document from the client terminal of the first user;
produce a first document by reflecting the one or more editing commands to the markup language-based document stored in the memory;
when a request for participation in the cooperation for the joint editing of the electronic document is received from a client terminal of a second user connected through the network, transmit the first document to the client terminal of the second user in response to the request for the participation in the cooperation;
receive a request for transmission of first commands from the client terminal of the second user after transmitting the first document, wherein the first commands are editing commands further received from the client terminal of the first user while the first document is transmitted to the client terminal of the second user, in addition to the one or more editing commands;
determine whether there exist the first commands received from the client terminal of the first user while the first document is transmitted to the client terminal of the second user, in response to the request for the transmission of the first commands; and
transmit the first commands to the client terminal of the second user when it is determined that there exist the first commands received from the client terminal of the first user while the first document is transmitted to the client terminal of the second user.

2. The apparatus of claim 1, wherein when the client terminal of the first user receives the markup language-based document, the client terminal of the first user renders the markup language-based document through a first browser installed in the client terminal of the first user and displays the markup language-based document on a screen, edits the markup language-based document, which is displayed on the screen, according to the one or more editing commands input from the first user, and transmits the one or more editing commands to the apparatus for supporting the cooperation for the joint editing of the electronic document.

3. The apparatus of claim 1, wherein the processor is further configured to:
allocate a revision number to each of the one or more editing commands in an order of generation of the one or more editing commands when the one or more editing commands are received from the client terminal of the first user;
transmit only a first revision number among the allocated revision numbers, to the client terminal of the second user in response to the request for the participation in the cooperation, wherein the first revision number is a revision number last allocated to the one or more editing commands;
receive the first commands from the client terminal of the first user after transmitting the first document and the first revision number; and
additionally allocate a revision number, which starts with a number after the first revision number, to each of the first commands in an order of generation of the first commands, and
wherein the processor receives the request for the transmission of the first commands, to which the revision numbers after the first revision number are allocated,
the processor determines whether there exist the first commands, to which the revision numbers after the first revision number are allocated, in response to the request for the transmission of the first commands, and
the processor transmits the first commands, to which the revision numbers after the first revision number are allocated, to the client terminal of the second user.

4. The apparatus of claim 3, wherein when the client terminal of the second user receives the first document, the client terminal of the second user renders the first document through a second browser installed in the client terminal of the second user and displays the first document on a screen, and transmits the request for the transmission of the first commands, to which the revision numbers after the first revision number are allocated, to the apparatus for supporting the cooperation for the joint editing of the electronic document.

5. A method of operating an apparatus for supporting cooperation for joint editing of an electronic document, the method comprising:

when a request for an access to an original electronic document that is a cooperation target is received from a client terminal of a first user connected through a network, converting the original electronic document into a markup language-based document and storing the markup language-based document in a memory, and transmitting the markup language-based document to the client terminal of the first user;

receiving one or more editing commands for the markup language-based document from the client terminal of the first user;

producing a first document by reflecting the one or more editing commands to the markup language-based document stored in the memory;

when a request for participation in cooperation for joint editing the electronic document is received from a client terminal of a second user connected through the network, transmitting the first document to the client terminal of the second user in response to the request for the participation in the cooperation;

receiving a request for transmission of first commands from the client terminal of the second user after transmitting the first document, wherein the first commands are editing commands further received from the client terminal of the first user while the first document is transmitted to the client terminal of the second user, in addition to the one or more editing commands;

determining whether there exist the first commands received from the client terminal of the first user while the first document is transmitted to the client terminal of the second user, in response to the request for the transmission of the first commands; and transmitting the first commands to the client terminal of the second user when it is determined that there exist the first commands received from the client terminal of the first user while the first document is transmitted to the client terminal of the second user.

6. The method of claim 5, wherein when the client terminal of the first user receives the markup language-based document, the client terminal of the first user renders the markup language-based document through a first browser installed in the client terminal of the first user and displays the markup language-based document on a screen, edits the markup language-based document, which is displayed on the screen, according to the one or more editing commands input from the first user, and transmits the one or more editing commands to the apparatus for supporting the cooperation for the joint editing of the electronic document.

7. The method of claim 5, further comprising:

when the one or more editing commands are received from the client terminal of the first user, allocating a revision number to each of the one or more editing commands in an order of generation of the one or more editing commands;

transmitting only a first revision number among the allocated revision numbers, to the client terminal of the second user in response to the request for the participation in the cooperation, wherein the first revision number is a revision number last allocated to the one or more editing commands;

receiving the first commands from the client terminal of the first user after transmitting the first document and the first revision number; and additionally allocating a revision number, which starts with a number after the first revision number, to each of the first commands in an order of generation of the first commands, wherein the receiving of the request for the transmission of the first commands includes receiving the request for the transmission of the first commands, to which the revision numbers after the first revision number are allocated, the determining whether there exist the first commands includes determining whether there exist the first commands, to which the revision numbers after the first revision number are allocated, in response to the request for the transmission of the first commands, and the transmitting of the first commands to the client terminal of the second user includes transmitting the first commands to which the revision numbers after the first revision number are allocated, to the client terminal of the second user.

8. The method of claim 7, wherein when the client terminal of the second user receives the first document, the client terminal of the second user renders the first document through a second browser installed in the client terminal of the second user and displays the first document on a screen, and transmits the request for the transmission of the first commands, to which the revision numbers after the first revision number are allocated, to the apparatus for supporting the cooperation for the joint editing of the electronic document.

9. A non-transitory computer readable recoding medium in which a program for executing a method of operating an apparatus for supporting cooperation for joint editing of an electronic document is recorded, the method comprising:

when a request for an access to an original electronic document that is a cooperation target is received from a client terminal of a first user connected through a network, converting the original electronic document into a markup language-based document and storing the markup language-based document in a memory, and transmitting the markup language-based document to the client terminal of the first user;

receiving one or more editing commands for the markup language-based document from the client terminal of the first user;

producing a first document by reflecting the one or more editing commands to the markup language-based document stored in the memory;

when a request for participation in cooperation for joint editing the electronic document is received from a client terminal of a second user connected through the network, transmitting the first document to the client terminal of the second user in response to the request for the participation in the cooperation;

receiving a request for transmission of first commands from the client terminal of the second user after transmitting the first document, wherein the first commands are editing commands further received from the client terminal of the first user while the first document is transmitted to the client terminal of the second user, in addition to the one or more editing commands;

determining whether there exist the first commands received from the client terminal of the first user while the first document is transmitted to the client terminal of the second user, in response to the request for the transmission of the first commands; and transmitting the first commands to the client terminal of the second user when it is determined that there exist the first commands received from the client terminal of the first user while the first document is transmitted to the client terminal of the second user.

\* \* \* \* \*